April 16, 1957  E. GERMAIN  2,788,920
CONDIMENT CASTOR
Original Filed May 19, 1948  2 Sheets-Sheet 1
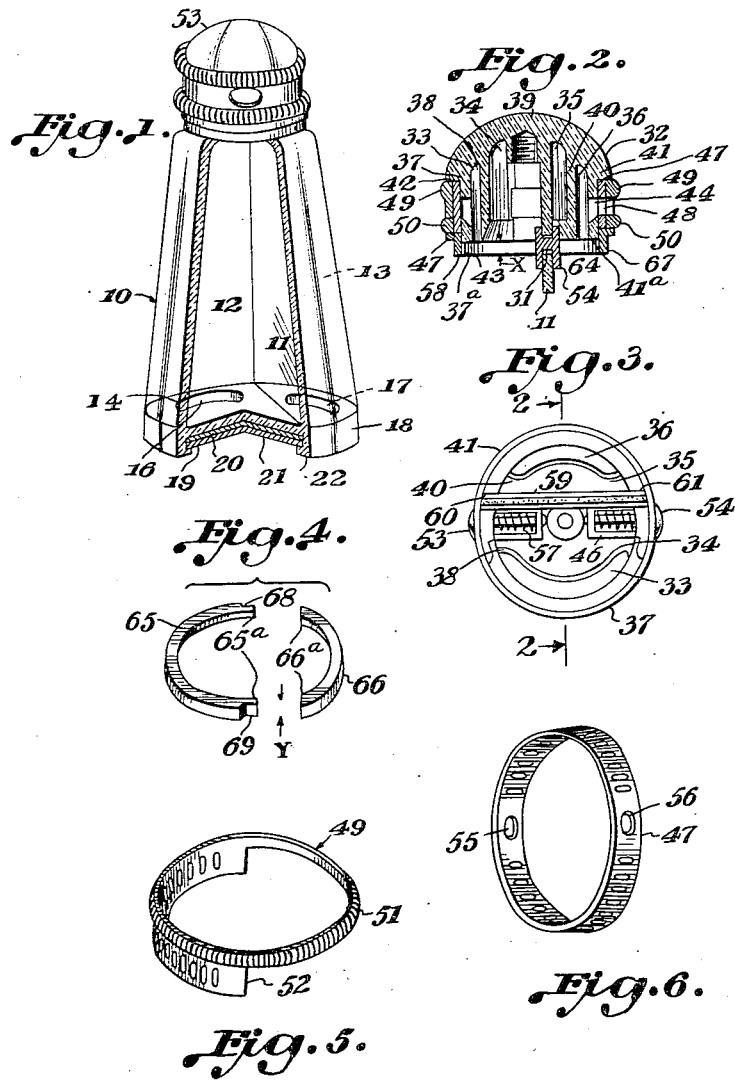
Ernest Germain, April 16, 1957        E. GERMAIN        2,788,920
CONDIMENT CASTOR
Original Filed May 19, 1948        2 Sheets-Sheet 2

*Ernest Germain*

United States Patent Office 2,788,920
Patented Apr. 16, 1957

2,788,920

CONDIMENT CASTER

Ernest Germain, Ville St. Laurent, Quebec, Canada, assignor to Lillian Germain, Ville St. Laurent, Montreal, Quebec, Canada Continuation of abandoned application, Serial No. 250,748, October 10, 1951, which is a continuation of abandoned application Serial No. 36,556, May 19, 1948. This application May 4, 1954, Serial No. 427,592

Claims priority, application Canada November 17, 1951

2 Claims. (Cl. 222—142.6)

This application is a continuation of application for Condiment Holders, Serial No. 250,748, filed October 10, 1951, now abandoned, continuation of original application for Salt and Pepper Castors, Serial No. 36,556, filed May 19, 1948, now abandoned.

The invention relates to condiment castors, and more particularly to a container having compartments for holding more than one condiment.

An object of my invention is to provide a salt and pepper dispenser having automatic dependent closure means for a condiment while another condiment is being dispensed.

Another object of my invention is to provide a dispenser having readily adjustable dispensing apertures, which may be regulated to control the flow of condiments and positively closed for travelling or storing purposes.

A further object of my invention is to provide a condiment castor of simple design which will be economical to manufacture and yet, which will be rugged enough to withstand the shocks encountered in being transported by travellers such as soldiers, hikers, campers, etc.

These and other objects and advantages will become apparent from the following description of the present invention illustrated in the accompanying drawings, in which:

Figure 1 is a perspective view of my combination condiment castor.

Figure 2 is a cross-section of the top of my dispenser taken along line 2—2 of Figure 3 with the closure elements enclosed, forming a part of my invention not shown.

Figure 3 is a bottom view of the top of my dispenser as shown in Figure 2 with the closure elements shown.

Figure 4 is a perspective view of the closure elements used with my invention.

Figure 5 is a perspective view of one of the annular closure devices employed in my invention.

Figure 6 is a perspective view of a perforated ring.

Similar reference characters in the several figures represent similar parts.

Figure 7:
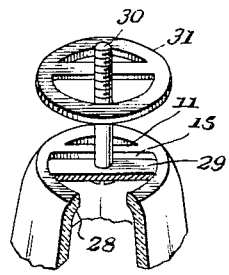
Figure 7 is a combined perspective and sectional view showing the upper portion of the receptacle with the top removed.

In the preferred form of the invention the receptacle dispenser indicated in Figure 1 by the numeral 10 is of a generally conico-cylindrical shape having a partition 11 forming two compartments 12 and 13 therein. The receptacle has a bottom forming portion 14, whereas the top is left open as shown by 15 in Figure 7. The bottom portion 14 has two openings 16 and 17 therethrough respectively, leading into compartments 12 and 13. A lower peripheral section 18 of the receptacle extends vertically downward from the bottom portion 14. An inner recess 19 is formed in this downwardly extending portion. Within the recess 19 a thrust plate 20 and a bottom plate 21 are retained. The receptacle is preferably made of a transparent plastic material, however it may obviously be made of metal or any other suitable substance.

Figure 10:
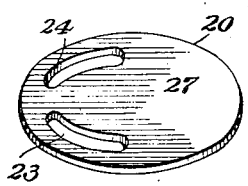
Figure 10 is a perspective view of a thrust plate I employ.

As shown in Figure 10 the thrust member 20 has two openings 23 and 24 therethrough. The openings 23 and 24 are positioned so as to be in alignment with the openings 16 and 17 respectively. The plate 21 has an opening 25 therethrough. Thrust plate 20 is non-rotatably mounted within the recess 19, whereas the bottom plate 21 is rotatably mounted therein. This can be accomplished by forming plate 20 of larger circumference than bottom member 21 or by forming the upper part of recess 19 of smaller diameter than the lower part. Also, the portion surrounding openings 23 and 24 can be flared upwardly to engage with openings 16 and 17.

The bottom plate 21 has a depending knob 26 which may be rotated so as to align the aperture 25 with either one of the pairs of apertures 16 and 23 and 17 and 24 or to place aperture 25 under the closed portion 27 of plate 20. Thus there is provided a means of filling the compartments 12 and 13, respectively. The bottom plate 21 is then moved upwardly and a split resilient retaining ring placed within the recess 19 below the bottom plate.

As shown in Figure 7 the upper end of the receptacle has a lip 28. A cross plate 29 having a screw 30 rotatably inserted therein engages the lower surface of the lip on diametrically opposite sides thereof. Support plate 31 rests horizontally on the upper surface of the lip and the partition 11.

A cover or top 32 is mounted upon the support plate and threadingly engaged by screw 30. The cover 32 is preferably made of a plastic material and has compartments 34 and 35 formed therein which are closed at the top and open at the bottom. The compartments are formed by cover partitions 38, 39 and 40. Spaced openings 43 leading from chamber 33 are formed in the outer portion 37, and spaced openings 44 leading from chamber 36 are formed in the outer portion 41. The partitions 37, 38, 40 and 41 extend downwardly to present horizontally aligned bottom surfaces. The bottom of partition 39 which extends across the cover to divide the cover into two main compartments is slightly above the bottom of the other partitions for a purpose described hereinafter.

A boss 45 having screw threads for receiving the screw 30 is formed adjacent partition 39. Housings 46 are also formed adjacent partition 39. A circular ring 47 having apertures 48 is mounted within recess 42 so that the apertures 48 are in alignment with the apertures 43 and 44. Upon the ring 47 and also within recess 42 two separately rotatable rings 49 and 50 are mounted. Ring 49 is shown in Figure 5 and comprises a knurled annulus 51 and a depending semi-cylinder 52. Ring 50 is an exact duplicate thereof but is used upside down so that the circle of ring 50 appears below the cylinder 52 instead of above it, as shown. The semi-cylindrical portion 52 of ring 49 rides on the annular portion of ring 50, and the annulus 51 of ring 49 rides on the upstanding semi-cylindrical portion of the ring 50. The two semi-cylindrical portions do not together form a complete cylinder. There is ample space between adjacent edges of the two portions to permit the rotational movement of the two rings 49 and 50 which is described hereinafter.

Rings 49 and 50 have apertures therethrough of the same size as the apertures in the cover and ring 47. All the apertures are spaced the same distance from each other on each member and the distance between apertures is equal to or greater than the distance across the apertures. Thus it is seen that by rotating ring 49 on ring 50 the apertures of ring 49 can be brought in line with the apertures leading from chamber 43 and formed in the cover and ring 47. Also by rotating ring 50 the apertures therein can be brought in line with the apertures leading from chamber 36.

Pins 53 and 54 are designed with elliptically shaped heads overlying the rings 49 and 50, as shown in Figure 3, and are inserted through holes 55 and 56 in ring 47 and suitable holes in the housings 46. A spring 57 is attached to each pin and reacts against the cover to force each pin inwardly. The pins limit the rotational movement of the outer ring members 49 and 50, as well as serving to maintain the ring members in position. A flange member 58 (Figure 2) rests on the support plate 31. The flange 58 is attached to the cover 32 by any suitable means and aids in maintaining the rings in place.

Figure 12:
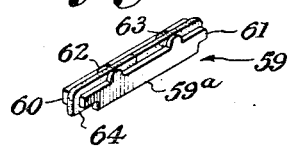
Figure 12 is a perspective view of a seal unit.

In Figure 12 a seal unit 59 is shown which consists of a small inverted channel section 59a having projecting end portions 60 and 61 and upstanding pairs of tabs 62 and 63. A piece of felt or other suitable material 64 is placed within the channel and the ends thereof are extended upwardly over the end portions and between the tabs. The channel section 59 slips over the support plate cross bar and partition 11 and the tabs 62, 63 closely fit partition 39. Seal unit 59 may be made as an integral part of the partition dependent of portion 39.

In Figure 4, I show two closure elements 65 and 66 which are supported upon plate 31. The external curved sides of closures 65 and 66 are formed to coincide with the internal side of the dependent portion 67 of the cover flange member 58 as seen in Figure 2 and wherein they are free to move. Closure 65 is cut back at 68 and 69 to facilitate such movement.

As shown in Figures 2, 3, 8 and 13 partition 39 delineates two main compartments within the top. Partition 39 when assembled is aligned with partition 11. Seal unit 59 lies between the two partitions. The seal unit lips 60 and 61 extend over the top of the plate 31 and the lip 28 of the base.

Figure 8:
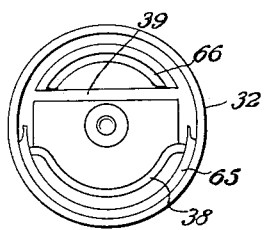
Figure 8 is another bottom view of the top used with this invention.
Figure 13:
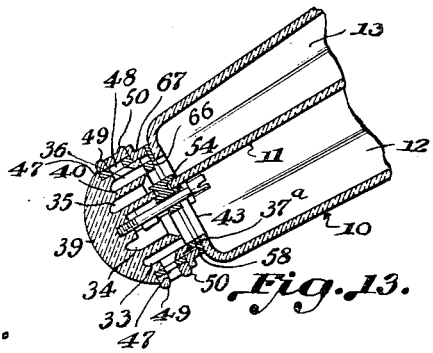
Figure 13 is a sectional view of my dispenser showing the relative position of the parts when condiment is being dispensed.

When assembled as described below, depending portion 67 of flange 58 rests on plate 31 as does seal unit 59. Cover side portion 37 and partition 38 on the left side of partition 39 are spaced a distance X (Figs. 2 and 13) above plate 31. Thus, there is a space within the flange member between plate 31 and the underside of cover portion 37, 41 and adjoined to chambers 33 and 36 formed by partitions 38 and 40 on each side of partition 39. The distance X is slightly greater than Y (Figure 4) which is the thickness of closures 65 and 66. When the dispenser is tilted the closures in the lower compartments are instantly tilted into the curved side of the flange member 58 forming an enclosure of the lower sides of the cover, spaced therein from the top of the receptacle and spaced radially from the openings of compartments 12 and 13. The parallel ends of the closures in the compartments above the partition are made to rest on the side of the seal unit 59 (Figs. 8 and 13). The elements are wider across their top and bottom surfaces than the space between side portions 37, 41 and partitions 38 and 40, and are curved, as are the chambers 33 and 36. (Figures 3, 4 and 8.) Therefore, closures 65 and 66 respectively, can move to a position in which the closures are transversely partition 38 and side portion 37 and partition 40 and side partition 41. In such positions chambers 33 and 36, respectively, are cut off from compartments 12 and 13. The closures are equal in width to the width of the portion 37a and 41a of the cover, respectively. When in such a position as to cut off said chambers 33 and 36 the inner or end portions 65a and 66a respectively, are resting on the seal unit 59. Thus, the closures can move toward the seal unit 59 until the legs of the respective closures are resting on said seal. When the dispenser is tilted on one side or the other, depending on which side condiment is desired to be dispensed, closures 65 and 66 are likewise tilted in a position adjoined to the communication of the corresponding chambers 33 and 36 respectively, into the outer cover wall lying downmost. (See Fig. 13.) In this position, the closures are resting on the internal side of dependent portion 67 of flange 58, between the cover wall and plate 31 thus, chambers 33 and 36 of the cover are respectively connected with compartments 12 and 13 of the receptacle. In the tilted position, the closure (66 in Figure 13) is resting on the side of the seal unit and closes off communication between the chamber and the compartments on the higher side. Thus, condiment will be dispensed from the lower side of the dispenser only.

In Figure 13 the dispenser is shown in the portion in which condiment is being dispensed from the larger compartment. Ring 49 has been rotated to uncover ports 43. Closure element 65 which has moved down to its lowest position is resting into the radial side of the cover, as shown in Figures 8 and 13, and chamber 33 which has the same shape as element 65 but which is slightly smaller in width is connected to chamber 12 in the receptacle, whereas, chamber 36 which has the same shape as element 66 has been shut off from chamber 13. When in this position the ends of the closure element 66 are resting on the side of the seal unit 59. Element 66 lies partly on partition 40 and cover side or outer portion 41 thus, effectively closing the communication of chamber 36 (Figures 8 and 13). When it is desired to dispense condiment from the smaller compartment 13, the dispenser is tilted so that the smaller compartment is lowermost. In this position closure 66 has like element 65 tilted down into the flange depending portion 67, connecting chamber 36 with compartment 13. At the same time closure element 65 has tilted down upon the side of the seal unit 59. In this position closure 65 closes the communication in the cover wall dependent of cover side portion 37 and partition of cover portion 38, disconnecting chamber 33 from compartment 12.

Figure 9:
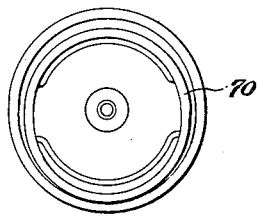
Figure 9 is a bottom view of a top which may be employed in dispensers having one compartment only.
Figure 11:
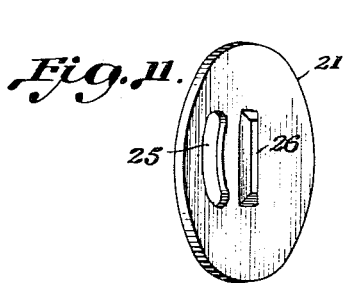
Figure 11 is a perspective view of a bottom plate forming a portion of the bottom of my dispenser.

In Figure 9 there is shown a ring type closure 70 which is suitable for dispensers having a single compartment.

From the foregoing description it will be seen that I have devised a condiment castor which is of considerable use to campers, etc. The dispenser is light and is so constructed that only one condiment castor need be carried.

While I have shown and described a preferred form of my invention, it will be understood that variations in details of form may be made without departure from the invention as defined in the appended claims.

I claim:

1. A dispenser comprising a receptacle having a longitudinally extending partition therein separating said receptacle into condiment receiving compartments, means for filling said compartments disposed at the bottom of said receptacle, a hollow cover detachably secured on the top of said receptacle and formed with depending partitions providing condiment receiving chambers with one of said partitions being aligned with the partition in said receptacle, said cover being provided with diametrically opposed dispensing openings communicating with said chambers, an annular channel formed about said cover, cooperating apertured closure rings rotatably mounted in said channel for selectively controlling the flow of condiments from said chambers through said dispensing openings, and slidable tumbler valve elements disposed between said chambers and said compartments for opening communication between one chamber and the adjacent compartment when the receptacle is tilted in the desired direction and for closing communication between the other chamber and adjacent compartment, whereby either condiment may be dispensed, depending upon the direction in which the receptacle is tilted.

2. The subject matter as claimed in claim 1, and a seal unit disposed between the adjacent edges of the receptacle partition and the aligned partition in said hollow cover.

References Cited in the file of this patent

UNITED STATES PATENTS

| | | | |
|---|---|---|---|
| 518,559 | Berry | | Apr. 17, 1894 |
| 1,235,985 | Leckey | | Aug. 7, 1917 |
| 1,518,887 | Widmann | | Dec. 9, 1924 |
| 1,904,757 | Watson | | Apr. 18, 1933 |